(12) United States Patent
Thiery et al.

(10) Patent No.: US 8,387,383 B2
(45) Date of Patent: Mar. 5, 2013

(54) AMBIENT-AIR PULSED VALVE FOR INTERNAL COMBUSTION ENGINES EQUIPPED WITH A TURBOCHARGER

(75) Inventors: Michael Thiery, Korschenbroich (DE); Max Herrmann, Neuss (DE); Harald Krause, Grevenbroich (DE); Heinrich Dismon, Gangelt (DE); Martin Nowak, Düsseldorf (DE); Rolf Lappan, Köln (DE)

(73) Assignee: Pierburg GmbH, Neuss (DE)

( * ) Notice: Subject to any disclaimer, the term of this patent is extended or adjusted under 35 U.S.C. 154(b) by 1125 days.

(21) Appl. No.: 12/092,046

(22) PCT Filed: Oct. 26, 2006

(86) PCT No.: PCT/EP2006/067833
§ 371 (c)(1),
(2), (4) Date: Sep. 15, 2008

(87) PCT Pub. No.: WO2007/048828
PCT Pub. Date: May 3, 2007

(65) Prior Publication Data
US 2009/0301081 A1   Dec. 10, 2009

(30) Foreign Application Priority Data
Oct. 29, 2005   (DE) .......................... 10 2005 051 971

(51) Int. Cl.
*F02B 33/44*   (2006.01)
*F16K 39/00*   (2006.01)
*F16K 31/02*   (2006.01)

(52) U.S. Cl. .... 60/611; 60/605.1; 251/282; 251/129.15; 251/129.16

(58) Field of Classification Search ................... 60/611, 60/605.1; 251/281–282, 129.15–129.18, 251/129.21, 53, 38; 137/469; *H02K 41/035; F02B 37/16, 37/12; F16K 31/10, 31/06, F16K 31/08, 31/363, 1/34, 1/36, 1/42, 1/44*
See application file for complete search history.

(56) References Cited

U.S. PATENT DOCUMENTS
(Continued)

FOREIGN PATENT DOCUMENTS
DE   29912814 U1   12/1999
DE   10020041 A1   10/2001
(Continued)

OTHER PUBLICATIONS
An English Machine Translation of Pub No. DE 100 20 041 A1, Published on Oct. 25, 2001.*
(Continued)

*Primary Examiner* — Thai Ba Trieu
(74) *Attorney, Agent, or Firm* — Norman B. Thot

(57) ABSTRACT

An air control valve for internal combustion engines having a turbocharger, is placed inside a bypass channel between a pressure side and an intake side of a boost pressure pump of the turbocharger, and has a housing which incorporates an electromagnetic drive unit and a valve unit movable in the housing. The valve unit has a valve rod and a valve closing body attached thereto and a circular sealing element. An arrangement is provided to keep the moving valve unit in a closed position when no current is supplied to the valve unit. At least one pressure compensation opening is provided in the moving valve unit, and the valve closing body has a cylindrical lateral surface which is arranged in such a manner that a housing interior is sealed towards the pressure side or the intake side.

4 Claims, 4 Drawing Sheets

U.S. PATENT DOCUMENTS

| | | | | |
|---|---|---|---|---|
| 2,504,428 | A * | 4/1950 | Kimball | 251/129.19 |
| 2,897,836 | A * | 8/1959 | Peters et al. | 251/282 |
| 3,023,777 | A * | 3/1962 | Collins | 251/129.02 |
| 3,069,846 | A * | 12/1962 | Buescher | 251/129.01 |
| 3,601,147 | A * | 8/1971 | Myers | 251/282 |
| 3,892,384 | A * | 7/1975 | Myers | 251/282 |
| 3,994,318 | A * | 11/1976 | Ishigaki | 251/45 |
| 4,121,619 | A * | 10/1978 | Pauliukonis | 137/469 |
| 4,522,372 | A * | 6/1985 | Yano et al. | 251/129.15 |
| 5,116,020 | A * | 5/1992 | Peng et al. | 251/129.17 |
| 5,358,005 | A * | 10/1994 | van Prooijen et al. | 137/546 |
| 5,443,309 | A * | 8/1995 | Beck | 251/129.08 |
| 6,328,276 | B1 * | 12/2001 | Falch et al. | 251/54 |
| 6,347,844 | B1 * | 2/2002 | Hosoya et al. | 303/119.2 |
| 6,776,391 | B1 * | 8/2004 | Goossens et al. | 251/129.15 |
| 6,935,612 | B2 * | 8/2005 | McCombs et al. | 251/129.15 |
| 7,757,873 | B2 * | 7/2010 | Thiery et al. | 215/282 |
| 2001/0025940 | A1 * | 10/2001 | Kumar | 251/129.16 |
| 2007/0051105 | A1 * | 3/2007 | Thiery et al. | 60/600 |
| 2008/0029725 | A1 * | 2/2008 | Ito et al. | 251/129.17 |
| 2009/0301080 | A1 * | 12/2009 | Hezel et al. | 60/602 |
| 2010/0072812 | A1 * | 3/2010 | Voss | 251/129.15 |
| 2010/0294966 | A1 * | 11/2010 | Czimmek et al. | 251/129.15 |

FOREIGN PATENT DOCUMENTS

| | | |
|---|---|---|
| DE | 10248125 A1 | 5/2004 |
| DE | 102008012467 B3 * | 8/2009 |
| DE | 102008031738 A1 * | 1/2010 |
| EP | 0416339 A1 | 3/1991 |
| EP | 1072784 A2 | 1/2001 |
| GB | 2103391 A | 2/1983 |
| GB | 2338050 A | 12/1999 |
| WO | 2006/029814 A | 3/2006 |
| WO | 2006/133986 A | 12/2006 |
| WO | 2007/048605 A1 | 5/2007 |

OTHER PUBLICATIONS

Machine Translation of the reference to Hermann (Pub. No. EP 416 339 A1), published on Mar. 13, 1991.*

A Certified English Translation of Buse (Pub. No. DE 100 20 041 A1), published on Oct. 25, 2001.*

International Search Report (PCT/ISA/210) issued in the corresponding application No. PCT/EP2006/010319 completed on Feb. 7, 2007 and mailed on Feb. 14, 2007.

International Search Report (PCT/ISA/210) issued in the corresponding application No. PCT/EP2006/067833 completed on Mar. 1, 2007 and mailed on Aug. 3, 2007.

* cited by examiner

AMBIENT-AIR PULSED VALVE FOR INTERNAL COMBUSTION ENGINES EQUIPPED WITH A TURBOCHARGER

This is a National Phase Application in the United States of International Patent Application No. PCT/EP2006/067833 filed Oct. 26, 2006, which claims priority on German Patent Application No. DE 10 2005 051 971.7, filed Oct. 25, 2005. The entire disclosures of the above patent applications are hereby incorporated by reference.

FIELD OF THE INVENTION

The invention relates to an air control valve for internal combustion engines comprising a turbocharger wherein the air control valve includes a valve closing body that comprises a cylindrical lateral surface cooperating with means such that a housing interior is sealed towards the pressure side or the intake side.

BACKGROUND OF THE INVENTION

Such air valves control are well known and are in particular described in DE 100 20 041 C2. The connection between the pressure side and the intake side of a boost pressure pump of a turbocharger via a bypass line is required for a transition from high load to overrun conditions of the internal combustion engine in order to prevent a high delivery rate of the boost pressure pump against a closed throttle flap, and the resultant pumping effects as well as a sudden excessive decrease in the turbo-speed resulting in thermodynamics problems. The air control valve described in DE 100 20 041 C2 comprises pressure compensation bores which ensure a pressure balance at the valve closing body in the closed position despite the pressure difference between the pressure side and the intake side of the boost pressure pump.

Since a calculation of the pressure balance is based on all pressure-loaded surfaces, the air control valve shown in FIG. 2 of the above cited patent can merely use the channel leading to the intake side as a valve seat since a cooperation of the valve with the channel leading to the pressure side would require a different configuration of the membrane 25.

It is therefore an object of the invention to provide an air control valve which is capable of cooperating with both the pressure side of the boost pressure pump and the intake side.

SUMMARY OF THE INVENTION

This object, in accordance with the present invention, is achieved by an air control valve for internal combustion engines comprising a turbocharger (1), wherein the air control valve (9) is arranged in a bypass channel (2) between a pressure side (12) and an intake side (11) of a boost pressure pump (3) of the turbocharger (1), a housing (10) having an electromagnetic drive unit (14) and a valve unit (15) movable in the housing (10), the valve unit (15) being essentially composed of a valve rod (16) and a valve closing body (17) attached thereto and having a circular sealing element (18), wherein means (21) are provided for keeping the movable valve unit in its condition as not supplied with current in the closed position, wherein at least one pressure compensation opening (19) is provided at the movable valve unit (15), characterized in that the valve closing body (17) comprises a cylindrical lateral surface cooperating with means such that a housing interior is sealed towards the pressure side (12) or the intake side (11). Thus it is ensured that in a simple manner the air control valve can be connected with both the pressure side of the boost pressure pump and the intake side. Since the lateral surface slightly tapers towards the sealing element, the lateral surface can be easily manufactured as an injection molded component. The radial sealing ring allows for a particularly simple and inexpensive sealing between the valve unit and the housing. Such an air control valve comprising a radial sealing ring can cooperated with both the pressure side and the intake side of the boost pressure pump. A configuration, which is particularly simple to realize, is achieved when the radial sealing ring is in abutment to the closing body. For ensuring a pressure balance at the movable valve unit it is of advantage when the inner diameter of the radial sealing ring equals the effective diameter of the circular sealing element.

In a particularly preferred embodiment, the valve closing body has a conical shape. The conical shape of the surface of the valve closing body allows the pressing force between the radial sealing ring and the valve closing body to decrease with increasing thrust such that the resultant friction force approaches zero. Although the power consumption of the air control valve necessary for overcoming the static friction in the closed position does not change, less energy is required over the overall path to be traversed. Consequently, the opening characteristic of the air control valve can be changed by modifying the geometry of the valve closing body in such a way that a higher closing force is available to the air control valve in the closed position.

Further, it has turned out advantageous that a first leg extending to the outside of the radial sealing ring is approximately two to five times longer than a second leg extending to the inside of the radial sealing ring. Thus the pressing forces of the radial sealing ring increased by the turbo-pressure and prevailing at the valve closing body can be minimized.

A different sealing configuration can be realized when the housing comprises a cylindrical housing portion at the level of the valve closing body, with the inner lateral surface of the cylindrical housing portion tapering to the same extent as the outer lateral surface of the valve closing body.

For ensuring a pressure balance at the valve closing body even during the opening or the closing phase, it is advantageous that the pressure compensation openings in the valve closing body are arranged in spaced relationship to the sealing element in the direction of the electromagnetic drive unit.

An embodiment of the invention is illustrated and described hereunder.

DETAILED DESCRIPTION OF THE INVENTION

Figure 1:
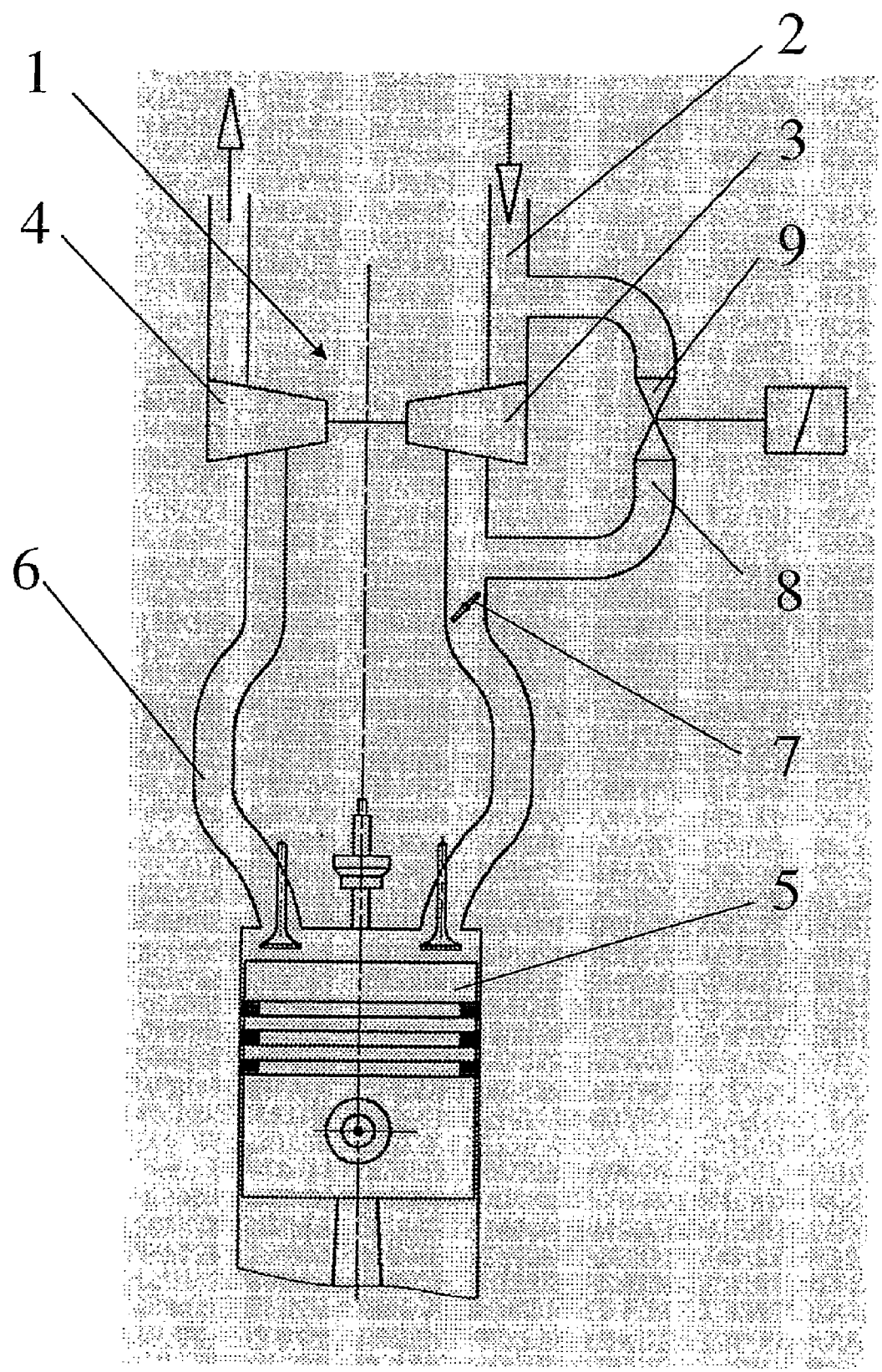
FIG. 1 shows a schematic representation of an internal combustion engine comprising a turbocharger.

FIG. 1 shows a schematic representation of an internal combustion engine, which is not illustrated in detail, comprising a turbocharger 1. Via an intake line 2 ambient air is taken in and compressed by the compressor 3 which is driven by an exhaust-side turbine 4, and subsequently fed to the combustion chamber 5 of the internal combustion engine. Via the exhaust line 6 and the turbine 4 the exhaust gas is then discharged from the combustion chamber 5. The control of the intake air to be fed to the combustion chamber 5 is realized by a throttle flap 7. When a quick-closing throttle flap is used, the quick closing action being provoked by a sudden deceleration, for example, a pumping effect of the turbocharger, which continues to rotate, against the closed throttle flap 7 is prevented in a known manner by providing a bypass line 8 comprising an air control valve 9. Via this bypass line 8 compressed intake air can be returned to the region of the intake line 2 upstream of the compressor 3.

Figure 2:
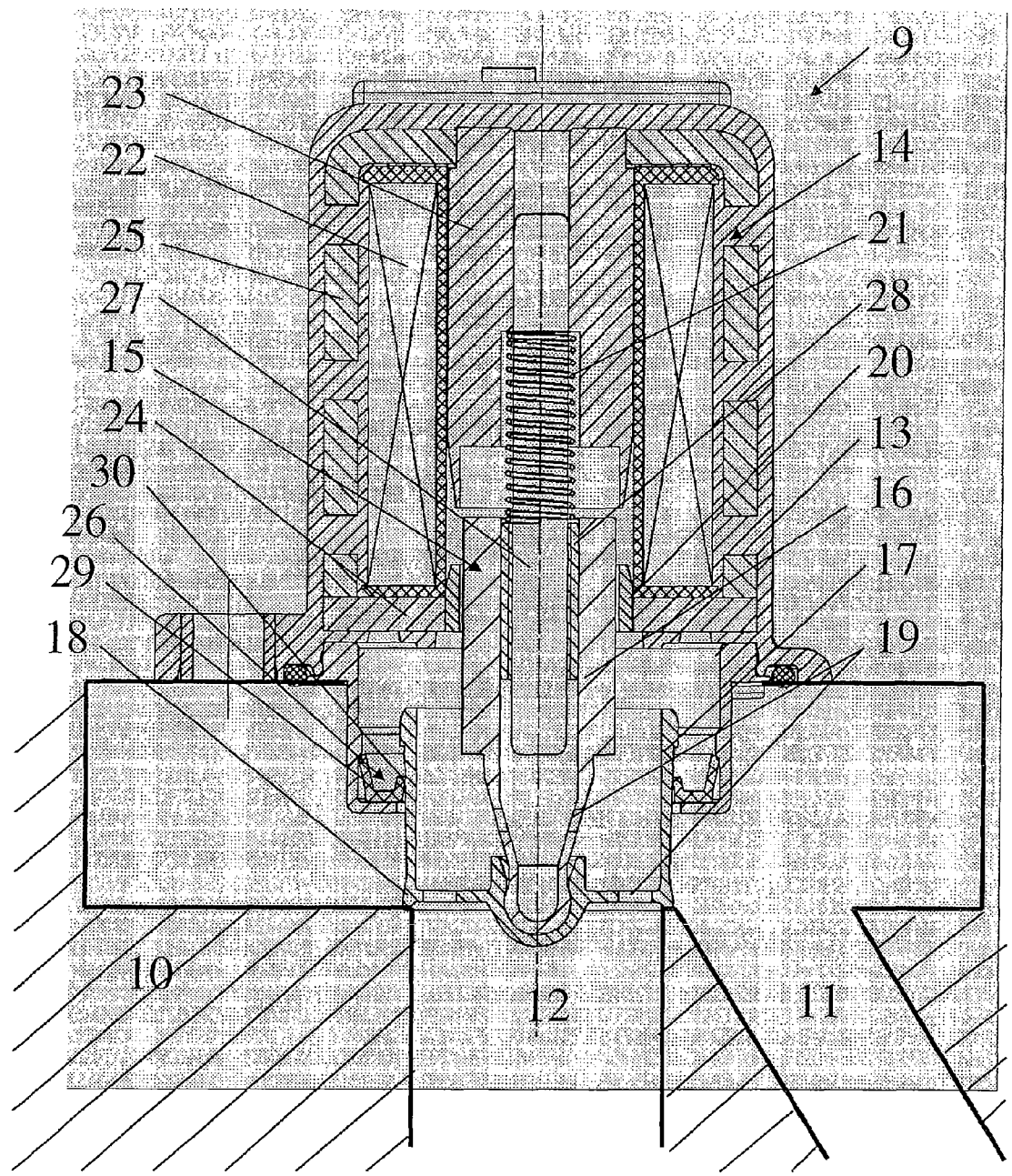
FIG. 2 shows a sectional view of an air control valve according to the invention.

FIG. 2 shows a sectional view of a first embodiment of an air control valve 9 according to the invention. In the illustrated embodiment, the air control valve 9 is directly flange-mounted to a housing 10 of the boost pressure pump 3. The air control valve thus separates a pressure side 12 from the intake side 11 of the boost pressure pump 3. If the internal combustion engine is suddenly decelerated due to a dangerous traffic situation, for example, and the throttle flap 7 is closed, the pressure side 12 is connected with the intake side 11 in order to return charged air to the intake side of the boost pressure pump 3, thus preventing the so-called "pumping effect" which may occur when the throttle flap 7 is closed.

The air control valve 9 according to the invention is essentially composed of a housing 13 accommodating an electromagnetic drive unit 14 and a valve unit 15 movable within the housing 13. The movable valve unit 15 essentially comprises a valve rod 16 acting as an armature, and a valve closing body 17 attached thereto and having a circular sealing element 18, with the intake surface of the valve closing body 17 being of conical shape. For allowing the closing or opening forces to be kept as small as possible and thus the electromagnetic drive unit 14 to be configured as small as possible, pressure compensation openings 19 are provided which ensure that the movable valve portion is equally pressurized from all sides. It should be noted that the closing body 17 is hollow and opens in a downward direction.

The electromagnetic drive unit 14 essentially comprises a coil 22, a core 23, a back-circuit plate 24 and a yoke 25. In the illustrated embodiment, the armature, which is attracted by the core 23 when the coil 22 is supplied with current, is, as has been described above, defined by the valve rod 16. The valve rod 16 and thus the valve closing body 17 are biased into the closing position by a compression spring 21 supported on the core 23. Thus, it is ensured that in the condition when the coil 22 is not supplied with current, the sealing element 18 is pressed against a valve seat of the housing 10 of the boost pressure pump 3, thus separating the intake line from the compressed air line. The valve rod 16 is supported by a guide bushing 20 in the housing 13 such that, when the coil 22 is supplied with current, the movable valve unit 15 is moved towards the core 23, and in this manner the bypass line 8 is cleared. In the present embodiment, the compression spring 21 is arranged on a journal 27 fixedly connected with the housing 13. At the lower portion of the journal 27 the valve rod 16 slides via a press-fitted bearing bushing 28 on which in turn the compression spring 21 may be supported.

Via the pressure compensation openings 19 and along the valve rod 16 in the region of the guiding bushing 20 a pressure compensation takes place in such a manner that the movable valve unit 15 is always pressure-balanced. That is, in the closed position of the air control valve 9 the pressure in the intake line 2 is applied to the movable valve portion. The movable valve unit is fluid-tightly sealed towards the pressure in the pressure line by a radial sealing ring 26. This offers the great advantage that in the illustrated embodiment the high pressure in the pressure line is merely applied to the radially extending surface of the closing body 17. Here, however, the forces acting upon this surface from top and bottom are balanced. No further pressure is applied to any membrane body, as is the case in prior art. Thus no complicated configuration of a membrane body depending on the installation situation is required. In the present case, a first leg 29 extending to the outside is approximately twice as long as a second leg 20 of the radial sealing ring 26. Further, the lateral surface 31 of the valve closing body 17 tapers towards the sealing element 18, resulting in a reduction of the friction forces.

Figure 3:
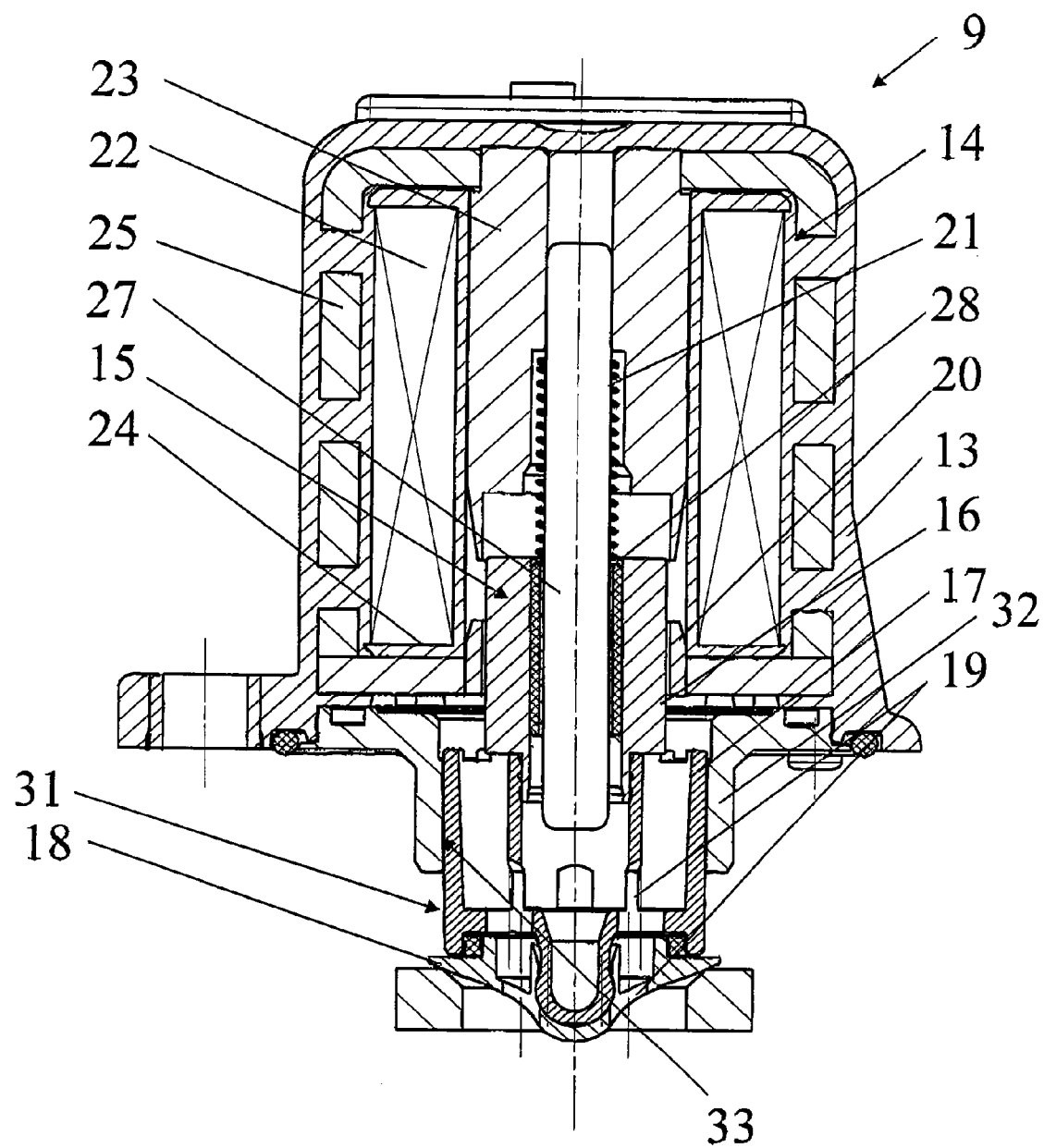
FIG. 3 shows a sectional view of an alternative embodiment of an air control valve according to the invention.

FIG. 3 shows an alternative embodiment of the air control valve 9 according to the invention. Here, no radial sealing ring 26 is provided but a housing portion 32 of the housing 13 comprising an inner lateral surface 33 at the level of the valve closing body 17, the inner lateral surface 33 tapering to the same extent as the outer lateral surface 31 of the valve closing body 17. On the one hand, this arrangement can ensure an adequate sealing, and on the other hand this arrangement is inexpensive to manufacture in a injection molding process.

Figure 4:
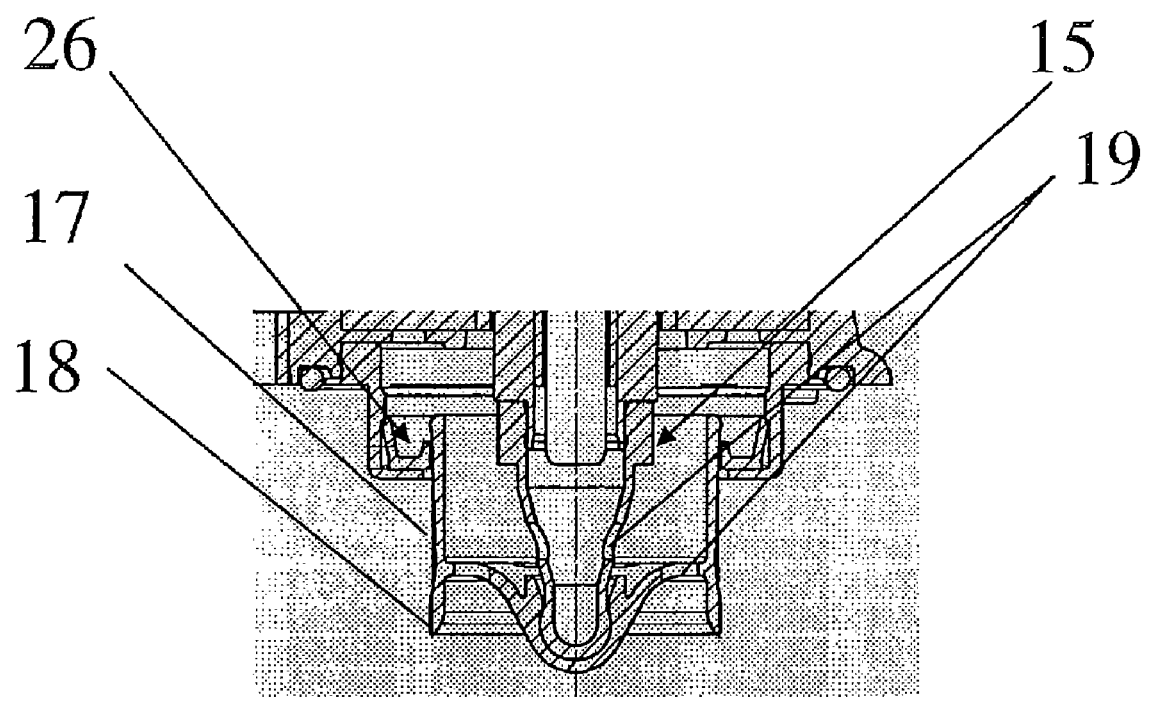
FIG. 4 shows a detailed view of a preferred embodiment of the closing body.

FIG. 4 shows a detailed view of a preferred embodiment of the valve closing body 17. Here, the pressure balance openings provided in the valve closing body 17 are arranged in spaced relationship to the sealing element 18 in the direction of the electromagnetic drive unit 14 not shown in this Figure. In this manner, it is prevented that upon opening of the air control valve 9 the pressure balance is disturbed for a short time by the high flow velocity and the respective lower pressure since the surface, upon which the lower pressure acts, is minimized to the very small sealing element 18 of the valve closing body 17. Behind the sealing element 18 the dynamic pressure drops correspondingly, and the static pressure increases and acts in known manner upon the underside of the valve closing body 17.

It should be noted that such a valve closing body can, of course, also be used in the embodiment shown in FIG. 3

The invention claimed is:

1. An air control valve for internal combustion engines comprising a turbocharger, wherein the air control valve is arranged in a bypass channel between a pressure side and an intake side of a boost pressure pump of said turbocharger, wherein the air control valve comprises:
   a housing having an electromagnetic drive unit; and
   a valve unit movable in said housing, wherein said valve unit includes:
      a valve rod, and
      a valve closing body attached thereto and having a circular sealing element,
   wherein means are disposed for keeping said movable valve unit in a condition as not supplied with current in the closed position,
   wherein at least one pressure compensation opening is provided at said movable valve unit,
   wherein said valve closing body comprises a cylindrical lateral surface in sliding sealing engagement with sealing means so that a housing interior is sealed towards said pressure side or said intake side of the boost pressure pump wherein a radial sealing ring is in abutment to the lateral surface of the valve closing body;
   wherein an inner diameter of the radial sealing ring is equal to the effective diameter of the circular sealing element so that a pressure balance is ensured at the movable valve unit, and
   wherein a first leg extending to the outside of the radial sealing ring is approximately two to five times longer than a second leg extending to the inside of said radial sealing ring.

2. An air control valve for internal combustion engines comprising a turbocharger, wherein the air control valve is arranged in a bypass channel between a pressure side and an intake side of a boost pressure pump of said turbocharger, wherein the air control valve comprises:
   a housing having an electromagnetic drive unit; and
   a valve unit movable in said housing, wherein said valve unit includes:
      a valve rod, and
      a valve closing body attached thereto and having a circular sealing element,
   wherein means are disposed for keeping said movable valve unit in a condition as not supplied with current in the closed position,
   wherein at least one pressure compensation opening is provided at said movable valve unit,
   wherein said valve closing body comprises a cylindrical lateral surface in sliding sealing engagement with sealing means so that a housing interior is sealed towards said pressure side or said intake side of the boost pressure pump,
   wherein the cylindrical lateral surface slightly tapers towards the sealing element,
   wherein a radial sealing ring is in abutment to the lateral surface of the valve closing body,
   wherein an inner diameter of the radial sealing ring is equal to the effective diameter of the circular sealing element so that a pressure balance is ensured at the movable valve unit, and
   wherein a first leg extending to the outside of the radial sealing ring is approximately two to five times longer than a second leg extending to the inside of said radial sealing ring.

3. An internal combustion engine comprising:
(a) a turbocharger; and
(b) an air control valve,
   wherein the air control valve is arranged in a bypass channel between a pressure side and an intake side of a boost pressure pump of said turbocharger,
   wherein the air control valve further comprises:
      a housing having an electromagnetic drive unit; and
      a valve unit movable in said housing,
         wherein said valve unit includes:
            a valve rod, and
            a valve closing body attached thereto and having a circular sealing element,
   wherein means are disposed for keeping said movable valve unit in a condition as not supplied with current in the closed position,
   wherein at least one pressure compensation opening is provided at said movable valve unit,
   wherein said valve closing body comprises a cylindrical lateral surface in sliding sealing engagement with sealing means so that a housing interior is sealed towards said pressure side or said intake side of the boost pressure pump wherein a radial sealing ring is in abutment to the lateral surface of the valve closing body;
   wherein an inner diameter of the radial sealing ring is equal to the effective diameter of the circular sealing element so that a pressure balance is ensured at the movable valve unit, and
   wherein a first leg extending to the outside of the radial sealing ring is approximately two to five times longer than a second leg extending to the inside of said radial sealing ring.

4. An internal combustion engine comprising:
(a) a turbocharger; and
(b) an air control valve,
   wherein the air control valve is arranged in a bypass channel between a pressure side and an intake side of a boost pressure pump of said turbocharger,
   wherein the air control valve further comprises:
      a housing having an electromagnetic drive unit; and
      a valve unit movable in said housing,
         wherein said valve unit includes:
            a valve rod, and
            a valve closing body attached thereto and having a circular sealing element,
   wherein means are disposed for keeping said movable valve unit in a condition as not supplied with current in the closed position,
   wherein at least one pressure compensation opening is provided at said movable valve unit,
   wherein said valve closing body comprises a cylindrical lateral surface in sliding sealing engagement with sealing means so that a housing interior is sealed towards said pressure side or said intake side of the boost pressure pump,
   wherein the cylindrical lateral surface slightly tapers towards the sealing element,
   wherein a radial sealing ring is in abutment to the lateral surface of the valve closing body,
   wherein an inner diameter of the radial sealing ring is equal to the effective diameter of the circular sealing element so that a pressure balance is ensured at the movable valve unit, and
   wherein a first leg extending to the outside of the radial sealing ring is approximately two to five times longer than a second leg extending to the inside of said radial sealing ring.

\* \* \* \* \*